US006829104B2

(12) United States Patent
Suzuki et al.

(10) Patent No.: US 6,829,104 B2
(45) Date of Patent: Dec. 7, 2004

(54) RESIN-MADE NON-SPHERICAL OPTICAL ELEMENT, OPTICAL SCANNING DEVICE USING THE OPTICAL ELEMENT, AND IMAGE FORMING APPARATUS USING THE OPTICAL SCANNING DEVICE

(75) Inventors: Seizo Suzuki, Yokohama (JP); Hiromichi Atsuumi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 305 days.

(21) Appl. No.: 10/161,659

(22) Filed: Jun. 5, 2002

(65) Prior Publication Data
US 2003/0011891 A1 Jan. 16, 2003

(30) Foreign Application Priority Data
Jun. 5, 2001 (JP) .......................................... 2001-169360

(51) Int. Cl.[7] .......................... G02B 13/18; G02B 26/08
(52) U.S. Cl. ........................ 359/718; 359/668; 359/207
(58) Field of Search ................................ 359/206, 207, 359/662, 668, 710, 711, 718

(56) References Cited

U.S. PATENT DOCUMENTS

| | | | |
|---|---|---|---|
| 5,875,051 A | 2/1999 | Suzuki et al. ................ 359/205 |
| 5,986,791 A | 11/1999 | Suzuki et al. ................ 359/207 |
| 6,069,724 A | 5/2000 | Hayashi et al. .............. 359/206 |
| 6,078,419 A | 6/2000 | Atsuumi ....................... 359/207 |
| 6,081,386 A | 6/2000 | Hayashi et al. .............. 359/641 |
| 6,104,522 A | 8/2000 | Hayashi et al. .............. 359/207 |
| 6,141,133 A | 10/2000 | Suzuki et al. ................ 359/207 |
| 6,198,563 B1 | 3/2001 | Atsuumi ....................... 359/208 |
| 6,222,662 B1 | 4/2001 | Suzuki et al. ................ 359/205 |
| 6,233,081 B1 | 5/2001 | Suzuki et al. ................ 359/212 |
| 6,256,133 B1 | 7/2001 | Suzuki et al. ................ 359/207 |
| 6,347,004 B1 | 2/2002 | Suzuki et al. ................ 359/205 |
| 6,359,717 B2 * | 3/2002 | Suzuki et al. ................ 359/205 |
| 6,376,837 B1 | 4/2002 | Itabashi et al. ............... 250/234 |
| 6,381,057 B1 | 4/2002 | Itabashi ........................ 359/204 |
| 6,384,949 B1 | 5/2002 | Suzuki ........................ 359/196 |
| 6,388,792 B1 | 5/2002 | Atsuumi et al. ............. 359/207 |
| 6,400,391 B1 * | 6/2002 | Suhara et al. ................ 347/244 |
| 6,417,509 B1 * | 7/2002 | Atsuumi et al. ............. 250/234 |
| 6,429,956 B2 | 8/2002 | Itabashi ........................ 359/204 |
| 6,448,998 B1 * | 9/2002 | Suzuki et al. ................ 347/258 |
| 6,469,772 B1 | 10/2002 | Itabashi ........................ 355/47 |
| 6,498,617 B1 | 12/2002 | Ishida et al. ................. 347/252 |
| 6,509,995 B1 * | 1/2003 | Suzuki et al. ................ 359/196 |
| 6,596,985 B2 * | 7/2003 | Sakai et al. .................. 250/234 |
| 6,621,512 B2 * | 9/2003 | Nakajima et al. ........... 347/245 |
| 6,624,920 B2 * | 9/2003 | Itabashi ........................ 359/205 |
| 6,657,761 B2 * | 12/2003 | Suzuki et al. ................ 359/205 |
| 6,657,765 B2 * | 12/2003 | Hayashi et al. .............. 359/225 |
| 6,686,946 B2 * | 2/2004 | Masuda et al. .............. 347/236 |
| 6,697,181 B2 * | 2/2004 | Masuda ........................ 359/196 |
| 6,700,687 B1 * | 3/2004 | Itabashi ........................ 359/212 |
| 6,707,480 B2 * | 3/2004 | Ameyama et al. .......... 347/129 |
| 6,731,317 B2 * | 5/2004 | Ema et al. .................... 347/135 |

OTHER PUBLICATIONS

Pub. No.: US 2002/0101642; Appl. No.: 10/058,446; Filed: Jan. 28, 2002; Inventor: Masuda, 359/196.

* cited by examiner

Primary Examiner—David N. Spector
(74) Attorney, Agent, or Firm—Oblon, Spivak, McClelland, Maier & Neustadt, P.C.

(57) ABSTRACT

A resin-made non-spherical optical element is a resin-made optical element made by plastic molding, in which at least one optical surface is formed in a non-spherical shape. The optical surface having the non-spherical shape includes an effective area and an area outside of the effective area located outside of the effective area. A shape of the optical surface in the area outside of the effective area smoothly continues to the shape in the effective area and is different from the non-spherical shape in the effective area.

21 Claims, 7 Drawing Sheets

MAIN SCANNING CROSS SECTION

SUB-SCANNING CROSS SECTION

RESIN-MADE NON-SPHERICAL OPTICAL ELEMENT, OPTICAL SCANNING DEVICE USING THE OPTICAL ELEMENT, AND IMAGE FORMING APPARATUS USING THE OPTICAL SCANNING DEVICE

BACKGROUND OF THE INVENTION

1. Field of the Invention

The present invention relates to a resin-made non-spherical optical element, an optical scanning device using the optical element, and an image forming apparatus using the optical scanning device.

2. Discussion of the Background

Optical elements such as plastic lenses formed by plastic molding of a resin material are widely used for reducing weight and cost of an optical system or for shaping a surface of the optical elements in a special shape.

A shape of a coaxial non-spherical surface (a non-spherical shape having a rotational symmetry with respect to an optical axis), which is typical as a special surface shape, is generally expressed by the following formula (1) using: a distance in the direction orthogonal to an optical axis, r; a depth in the optical axis direction, f(r); a radius of curvature on the optical axis, R; and constant numbers, K, $A_1$, $A_2$, $A_3$, ... , $$f(r)=(r^2/R)/[1+\{(1-(1+K)(r/R)^2)\}]+A_1 r+A_2 r^2+A_3 r^3+A_4 r^4+A_5 r^5+A_6 r^6+ \quad (1)$$

As the number of terms of higher degree on the right side of equation (1) increases, the shape of the non-spherical surface becomes more complicated, so that correction of wave-front aberration can be more finely made.

A complicated shape of a non-spherical surface can be formed in a precise manner by plastic molding. However, as known, in plastic molding a surface sink mark and an internal distortion tend to occur in the periphery of a molded piece.

Accordingly, in plastic molding, anticipating that a surface sink mark and/or an internal distortion occur in the periphery of a molded piece, it is necessary to prevent the surface sink mark and/or the internal distortion from extending toward an effective area (e.g., in a lens, an area within an effective lens diameter in which the design optical function can be assured) of the molded piece.

Therefore, for example, when manufacturing a lens having a non-spherical surface by plastic molding, a sufficient margin is provided to the outside of the effective diameter of the lens, i.e., the outside of the effective area of the lens, so that even if a surface sink mark or an internal distortion occurs at the periphery of the margin, the effective area is not affected by such a surface sink mark or an internal distortion.

As the degree of a term of higher degree of (r) on the right side of the above formula (1) is higher, when a lens is relatively large, a change in the depth in the axial direction of the lens is excessively large at the periphery of the lens, so that a difference in the thickness of the lens greatly differs between the vicinity of the optical axis and the periphery of the lens. In this case, when making a metal mold for plastic molding, due to constraint of a contact angle between a tip end of a cutting bite and a surface of the metal mold and of a resolution of bite moving steps, a desired surface shape cannot be obtained in the metal mold. As a result, a sufficient margin cannot be obtained at the outside of an effective area of the lens surface, thereby causing a surface sink mark and/or an internal distortion in the plastic molding.

Further, because a time period for cooling differs between the center part and the peripheral part of the lens because of the above-described relatively large thickness difference, the above-described surface sink mark and/or internal distortion tend to occur often.

Furthermore, depending upon the non-spherical shape, when (r) is relatively large, it may occur that $\{(1-(1+K)(r/R)^2\}$ on the right side of the above formula (1) is negative and $\{(1-(1+K)(r/R)^2\}$ is an imaginary number, such that the non-spherical surface itself cannot be expressed. In this case also, a sufficient margin cannot be obtained outside of the effective area of an optical surface.

For example, a lens constituting an fθ lens as a scanning image forming lens system of an optical scanning device may be relatively large such that the lens diameter in the main scanning direction exceeds 200 mm. In such a case, the above-described problem tends to occur rather often.

As a method for avoiding the above-described problem, in optical designing, a design may be made for a range broader than an effective area that is actually needed. However, the optimum optical performance may be shifted toward an outside of an effective diameter of a light ray, and as a result, the optical performance in the effective area may deteriorate.

Further, a straight line part (i.e. a flat part) that is discontinuous from a shape of an effective area may arise outside of the effective area. In this case, however, because a boundary between the effective area and an area outside of the effective area is discontinuous, in molding, the surface accuracy deteriorates in the vicinity of the boundary.

SUMMARY OF THE INVENTION

The present invention has been made in view of the above-discussed and other problems and addresses the above-discussed and other problems.

Preferred embodiments of the present invention provide a novel resin-made non-spherical optical element in which a relatively large area is provided outside of an effective area on its optical surface having a non-spherical shape so that an adverse affect of a surface sink mark and/or an interior distortion will not extend to the effective area.

Further, the preferred embodiments of the present invention provide an optical scanning device capable of performing a satisfactory optical scanning by using such a resin-made non-spherical optical element, and an image forming apparatus capable of performing a satisfactory image formation by using the optical scanning device.

A resin-made non-spherical optical element according to an embodiment of the present invention is a resin-made optical element made by plastic molding, in which at least one optical surface is formed in a non-spherical shape. The optical surface of the optical element having the non-spherical shape includes an effective area and an area located outside of the effective area.

Here, the non-spherical shape can include not only a coaxial non-spherical shape but also a non-arc shape in which the shape in the main scanning cross-section and/or the shape in the sub-scanning cross-section are non-arc. Further, the non-spherical shape includes a sub-scanning non-arc shape in which the non-arc shape in the sub-scanning cross-section changes in the main scanning direction. For example, a cylindrical surface and a toric surface have non-spherical shapes.

The optical surface here means a surface formed substantially in a mirror-surface-like surface by a metal mold with plastic molding. Rib parts and gate parts are excluded from the optical surface.

The effective area here is an area on an optical surface where the optical performance of the optical surface is assured. For example, in a lens for condensing a deflected light flux onto a scanned surface in optical scanning, the effective area is a combined area of an area where a light flux scanning the optical surface for forming an image on the scanned surface passes, an area where a light flux for synchronization detection passes, and an area into which a light flux may be shifted due to tolerances of the parts.

Thus, because the effective area of an optical surface is an area where an optical performance of the optical surface is assured, surface accuracy, internal distortion, and alien substances in the effective area must be managed so that the optical performance is assured in the effective area.

The area outside of the effective area is an area outside of the effective area on the above-described optical surface. The optical surface shape in the area outside of the effective area is set to smoothly continue to the optical surface shape in the effective area, and is formed in a shape different from the non-spherical shape in the effective area. Accordingly, in the area outside of the effective area, the above-described optical performance is not assured. When the above-described $\{(1-(1+K)(r/R)^2\}$ is an imaginary number so that a non-spherical shape cannot be expressed, a shape different from the non-spherical shape in the effective area refers to a concrete shape replacing the non-spherical shape.

The shape of the optical surface having the non-spherical shape in the area outside of the effective area can be a shape obtained by multiplying a shape of the optical surface in the area outside of the effective area, that is extended from the non-spherical shape in the effective area, by a damping function so that a change in an optical axis direction in the shape of the optical surface in the area outside of the effective area is damped.

For example, when a coordinate in the main scanning direction is expressed by Y, a coordinate in the sub-scanning direction is expressed by Z, a non-spherical shape expressing an optical surface is expressed by X(Y,Z), and a shape of the non-spherical shape X(Y,Z) in the effective area is expressed by Xin(Y,Z) and a shape thereof in the area outside of the effective area is expressed by Xout(Y,Z), if the coordinate position Y, Z is within the effective area, then X(Y,Z)=Xin(Y,Z) holds, and if the coordinate position Y, Z is out of the effective area, then X(Y,Z)=Xout(Y,Z) holds.

At this time, in an actual shape of the optical surface, by multiplying the shape in the area outside of the effective area Xout(Y,Z) by a damping function, a change in the shape in the area outside of the effective area is damped. For example, the shape of the optical surface in the area outside of the effective area can be made as expressed by the following formula:

$$X\text{out}(Y,Z)=X(Y,Z)\{1+(H-H_0)\times \text{Damp}\}.$$

In this formula, $H_0$ is a distance of a position of the border between the effective area and the area outside of the effective area from an optical axis of an optical element, and H is a distance of a position in the area outside of the effective area from the optical axis. Damp is a factor suppressing a change in a shape. Damp can be a constant number, or can be made as follows as a function of $H'=H-H_0$:

$$\text{Damp}(H')=D_0+D_1H'+D_2H'^2+D_3H'^3 \ldots$$

In the above formula, $\{1+(H-H_0)\times \text{Damp}\}$ is a damping function.

The above-described resin-made non-spherical optical element can be configured such that the optical surface having the non-spherical shape has shapes different from each other in two directions that are orthogonal to an optical axis and to each other. In this case, the optical surface in at least one of the two directions is an anamorphic optical surface having a non-arc shape, and the optical surface includes the effective area and the area outside of the effective area in the direction in which the optical surface has the non-arc shape. This optical element can be a lens for use in an optical scanning device in which the two directions orthogonal to each other correspond to a main scanning direction and a sub-scanning direction. Further, the optical element can be used in a scanning image forming optical system of the optical scanning device, which condenses a light flux deflected by a deflector toward a scanned surface to be formed into an optical spot on the scanned surface.

In the above-described optical element, the shape of the optical surface having the non-spherical surface in the area outside of the effective area can be made into a shape having a slope expressed by a 1st derivative at an outermost periphery of the effective area in the non-spherical shape.

When a non-spherical shape in the effective area is expressed by Xin(Y,Z), a shape of the area outside of the effective area is expressed by Xout(Y,Z), a coordinate of a border between the effective area and the area outside of the effective area is expressed by $H_0$ with the optical axis position as the origin of coordinates, and a coordinate in the area outside of the effective area is expressed by H with the optical axis position as the origin of coordinates, a shape of the area outside of the effective area is expressed by the following formulae:

$$X\text{out}(Y,Z)=[X\text{in}(H_0,Z)]+\{\partial[X\text{in}(H_c,Z)]/\partial Y\}\times(H-H_c) \text{ with respect to the main scanning direction; and}$$

$$X\text{out}(Y,Z)=[X\text{in}(Y,H_0)]+\{\partial[X\text{in}(Y,H_c)]/\partial Z\}\times(H-H_c) \text{ with respect to the sub-scanning direction.}$$

Here, $\partial[X\text{in}(H_c,Z)]/\partial Y$ and $\partial[X\text{in}(Y,H_c)]/\partial Z$ are inclination coefficients (1st derivatives) of the area outside of the effective area at $H_0$.

With the above-described configuration, a shape sharply inclined in the area outside of the effective area can be made to be moderately inclined.

The above-described optical element may be configured such that the optical surface having the non-spherical shape has shapes different from each other in two directions that are orthogonal to an optical axis and to each other. In this case, the optical surface in at least one of the two directions is an anamorphic optical surface having a non-arc shape, and the optical surface includes the effective area and the area outside of the effective area in the direction in which the optical surface has the non-arc shape.

Further, the above-described optical element may be a lens for use in an optical scanning device in which the two directions orthogonal to each other correspond to a main scanning direction and a sub-scanning direction. In this case, the optical element can be used in a line image forming optical system of the optical scanning device, which forms a light flux coupled from a light source side into a line image extending in the main scanning direction in a vicinity of a deflecting reflective surface of a deflector.

Each of the above-described resin-made non-spherical optical elements may be configured to satisfy a condition We/Wo<0.9 (2), in which the width of an optical surface is Wo and the width of the effective area is We.

In making a resin-made non-spherical optical element by plastic molding, a satisfactory surface can be obtained over a large area of an optical surface of the optical element by making a molding tact time longer. However, considering mass production efficiency, for avoiding a surface sink mark and/or an interior distortion from adversely influencing an effective area of the optical surface, it is effective to make an area outside of the effective area relatively large.

Therefore, by making an effective area smaller than 90% of an optical surface as in the above condition We/Wo<0.9 (2), a satisfactory optical element can be obtained. That is, after setting the size of an effective area of an optical surface to a necessary size, according to the set size of the effective area, the width of the optical surface can be determined so as to satisfy the condition We/Wo<0.9 (2).

An optical scanning device for optically scanning a scanned surface according to an embodiment of the present invention includes a light source, a coupling lens to couple a light flux from the light source to a subsequent optical system, a deflector to deflect the coupled light flux, and a scanning image forming optical system to condense the deflected light flux toward the scanned surface to be formed into an optical spot on the scanned surface so that the scanned surface is scanned by the optical spot. A resin-made non-spherical optical element of the present invention is arranged on an optical path from the light source to the scanned surface.

The optical scanning device may further include a line image forming optical system that forms a light flux coupled from a light source side into a line image extending in the main scanning direction in the vicinity of a deflecting reflective surface of a deflector. In this case, resin-made non-spherical optical elements of the present invention may be used in the line image forming optical system and in the image forming optical system. Further, a resin-made non-spherical optical element of the present invention may be used as a mirror.

An image forming apparatus according to an embodiment of the present invention includes a photosensitive medium and an optical scanning device of the present invention for scanning the photosensitive medium to form an image thereupon.

Various known types of photosensitive media can be used in the image forming apparatus. For example, a photographic printing paper that is colored by heating may be used for the photosensitive medium. An image can be formed by optically scanning the photographic printing paper with an optical spot and by thereby coloring the photographic printing paper by heat energy of the optical spot.

A photosensitive medium on which a latent image is formed by optical scanning may also be used. The latent image is made visible and thereby an image is formed. Further, a silver film may be used for the photosensitive medium. A latent image formed on a silver film by optical scanning is developed and fixed according to a known process for the silver film. Image forming apparatuses using such a photosensitive medium can be practiced as an optical plate making apparatus and an optical drawing apparatus.

Furthermore, a photoconductor may be used for the photosensitive medium. In this case, an electrostatic latent image is formed, which is then made visible as a toner image. The toner image is finally transferred onto a sheet-like-shaped recording medium.

A known zinc oxide photosensitive paper may also be used as the photoconductor. In this case, a toner image formed on the zinc oxide photosensitive paper is fixed on the zinc oxide photosensitive paper serving as a sheet-like-shaped recording medium.

When a photoconductor that can be repeatedly used is used, a toner image formed on the photoconductor is transferred onto a transfer sheet or an OHP sheet (a plastic sheet for use with an overhead projector) directly or via an intermediate transfer medium such as an intermediate transfer belt. The transferred toner image is fixed onto the transfer sheet or OHP sheet, and thereby a desired image is obtained.

The above-described image forming apparatus can be practiced as a digital copying machine, an optical printer, a facsimile machine, etc. Further, because image formation is performed by optical scanning, image information input to an optical scanning device of the image forming apparatus may be obtained by optically reading an original manuscript, generated by a computer, transmitted from an external source, etc.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein.

DESCRIPTION OF THE PREFERRED EMBODIMENTS

Figure 1A:
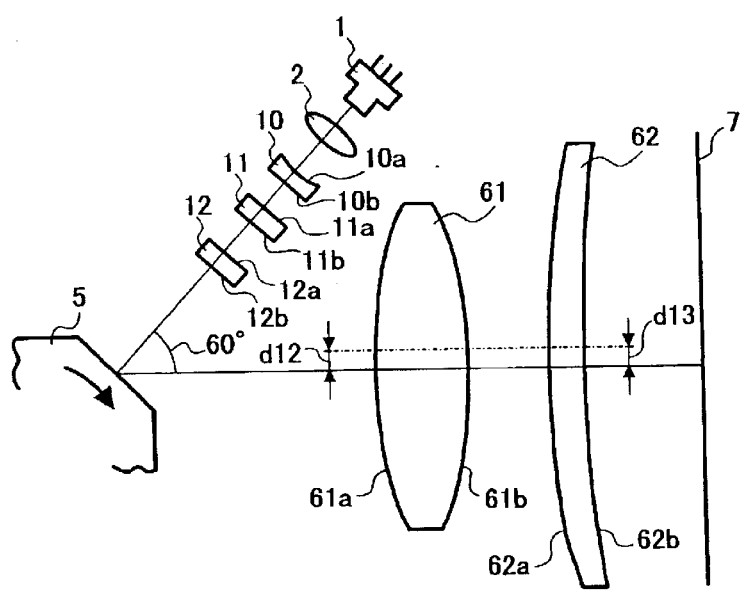
FIG. 1A is a diagram illustrating an optical arrangement of an optical scanning device according to a preferred embodiment of the present invention, viewed in a sub-scanning direction.

Referring now to the drawings, wherein like reference numerals designate identical or corresponding parts throughout the several views, preferred embodiments of the present invention are described.

Figure 1B:
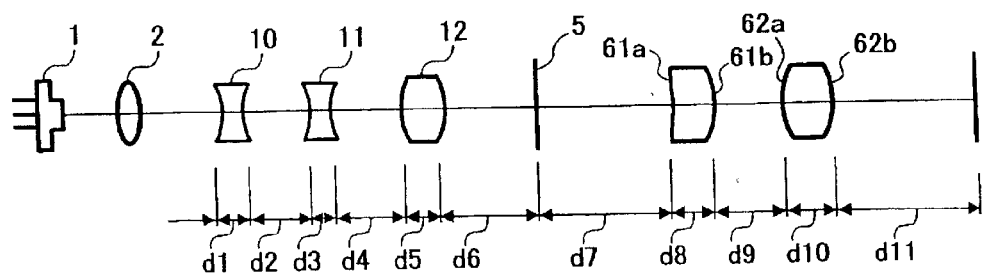
FIG. 1B is a diagram illustrating the optical arrangement of FIG. 1A developed in an optical axis direction on a straight line, viewed in a main scanning direction.

FIG. 1A is a diagram illustrating an optical arrangement of an optical scanning device according to a preferred embodiment of the present invention, viewed in a sub-scanning direction (i.e., a direction perpendicular to a surface of the figure). FIG. 1B is a diagram illustrating the optical arrangement of FIG. 1A linearly developed in an optical axis direction, viewed in a main scanning direction. In FIG. 1B, the up-and-down direction corresponds to the sub-scanning direction.

A divergent light flux emitted by a light source 1, which can be a semiconductor laser, is coupled by a coupling lens 2 to be formed into a desired light flux shape. The light flux after coupling may be a parallel light flux, or a weak divergent or converging light flux. In the embodiment of FIGS. 1A and 1B, the coupling lens 2 couples a light flux from the light source 1 to a substantially parallel light flux.

A parallel light flux emerging from the coupling lens 2 is incident on a resin-made lens 10. An incident-side lens surface 10a of the resin-made lens 10 is a spherical surface having a negative power. An emerging-side surface 10b of the resin-made lens 10 is a cylindrical surface having a negative power only in the sub-scanning direction. The light flux after passing through the resin-made lens 10 passes through a resin-made lens 11 (having an incident-side surface 11a and an emerging-side surface 11b) having a negative power only in the sub-scanning direction to be incident on a glass-made troidal lens 12 (having an incident-side surface 12a and an emerging-side surface 12b). The light flux after passing through the glass-made lens 12 is parallel in the main scanning direction and converging in the sub-scanning direction, and is formed into a line image extending in the main scanning direction in the vicinity of a deflecting reflective surface of a polygon mirror 5 serving as an optical deflector.

Figure 2A:
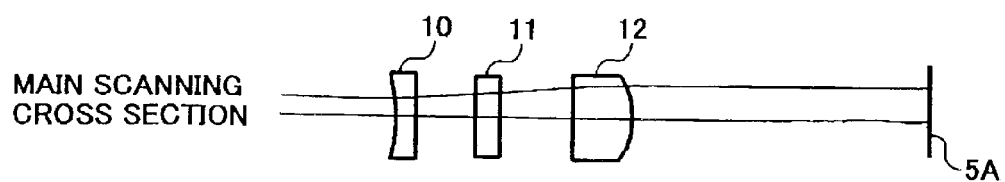
FIG. 2A is a diagram illustrating an optical action of a line image forming optical system of the optical scanning device in the main scanning direction.
Figure 2B:
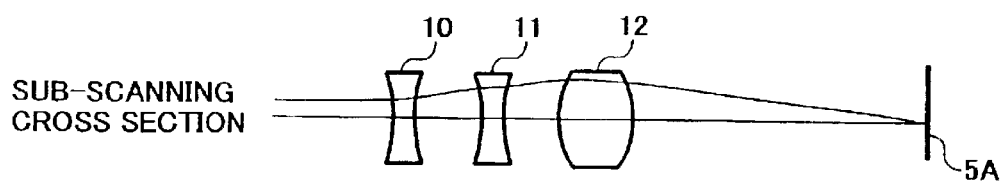
FIG. 2B is a diagram illustrating an optical action of the line image forming optical system in the sub-scanning direction.

Thus, the resin-made lenses 10 and 11 and the glass-made troidal lens 12 constitute a line image forming optical system. FIG. 2A is a diagram illustrating an optical action of the line image forming optical system in the main scanning direction and FIG. 2B is a diagram illustrating an optical action of the line image forming optical system in the sub-scanning direction. As apparent from FIGS. 2A and 2B, the line image forming optical system is an afocal system and has a function of expanding a light flux diameter as a beam expander in the main scanning direction, and has a function of converging a light flux in the sub-scanning direction. The resin-made lenses 10 and 11 are made by plastic molding. Reference symbol 5A denotes a deflecting reflective surface of the polygon mirror 5.

With equiangular rotation of the polygon mirror 5, a light flux reflected by a deflecting reflective surface of the polygon mirror 5 is deflected at an equiangular velocity to generate a deflected light flux, which then passes through, as shown in FIGS. 1A, 1B, a lens 61 and a lens 62 constituting a scanning image forming optical system. The deflected light flux is condensed by the function of the lenses 61 and 62, so that an optical spot is formed on a scanned surface 7 (typically a photosensitive surface of a photosensitive medium). The lenses 61 and 62 can be made of resin by plastic molding.

The scanning image forming optical system constituted by the resin-made lenses 61 and 62 is an fθ lens and accomplishes constant movement of an optical spot on the scanned surface 7. Thus, optical scanning of the scanned surface 7 is performed by an optical spot.

For the light source 1, besides a semiconductor laser as described above, a semiconductor laser array having a plurality of light emitting points and a multi-beam light source in which light fluxes from a plurality of semiconductor lasers are synthesized with each other by a beam synthesizing prism, etc. can be used. By using a multi-beam light source, the number of rotations of the polygon mirror 5 can be decreased to extend the life of the polygon mirror 5 as an optical deflector and at the same time decrease the power consumption.

Now, concrete data of each optical element of the optical scanning device of FIGS. 1A and 1B is given below.

A non-spherical shape is generally expressed by the following formula (3):

$$X(Y, Z) = CmY^2/[1+\{1-(1+K)Cm^2Y^2\}] + \quad (3)$$
$$A_1Y + A_2Y^2 + A_3Y^3 + \ldots + Cs(Y)Z^2 /$$
$$[1+\{1-(1+K_z(Y))Cs(Y)^2Z^2\}] + fsag(Y, Z)$$

Here, X represents depth of an optical surface in the optical axial direction, Y represents a coordinate in the main scanning direction originating at the optical axis position, and Z represents a coordinate in the sub-scanning direction originating at the optical axis position. The part $CmY^2/[1+\{1-(1+K)Cm^2Y^2\}]+A_1Y+A_2Y^2+A_3Y^3+\ldots$ at the right side of formula (3) represents a shape of a lens surface in a main scanning cross-section (a shape in a virtual plane surface cross-section parallel to the main scanning direction, including an X axis). At this time, Cm represents a paraxial curvature in the main scanning cross-section (inverse number of a paraxial radius of curvature: Rm, Cm=1/Rm) in the vicinity of the optical axis position (X=0), K represents a cone constant, and $A_1, A_2 \ldots$ are coefficients.

The part $Cs(Y)Z^2/[1+\{1-(1+K_z(Y))Cs(Y)^2Z^2\}]+fsag(Y,Z)$ of formula (3) expresses a shape of a lens surface in the sub-scanning cross-section at the coordinate Y in the main scanning direction (a virtual plane surface cross-section perpendicular to the main scanning direction).

Cs(Y) represents a paraxial curvature (inverse number of a paraxial radius of curvature: Rs(Y), Cs=1/Rs(Y)) in the sub-scanning cross-section at the coordinate Y in the main scanning direction in the vicinity of the position of Z=0 of the main scanning cross-section, and is expressed as follows as a function of Y:

$$Cs(Y)=1/Rs(0)+B_1Y+B_2Y^2+B_3Y^3+B_4Y^4+B_5Y^5 \ldots$$

$K_z(Y)$ is a cone constant in the shape in sub-scanning cross-section at the position of the coordinate Y in the main scanning direction, and is expressed as follows as a function of Y:

$$K_z(Y)=C_01+C_1Y+C_2Y^2+C_3Y^3+C_4Y^4+C_5Y^5 \ldots$$

Further, fsag(Y,Z) is expressed by the following formula:

$$fsag(Y,Z)=\Sigma(\Sigma d_{j,h}Y^h)Z^j.$$

The sum at the right side is obtained for h (=0, 1, 2, 3, . . . ) within the parenthesis and for j (=1, 2, 3, . . . ) outside of the parenthesis.

A sub-scanning non-arc surface refers to a surface shape in which the part of fsag(Y,Z) at the right side of formula (1) will be never 0.

The semiconductor laser for the light source may have a light emitting wavelength of 780 nm. The coupling lens may be a glass-made troidal lens. The focal length of the coupling lens may be 27 mm. The coupling lens may have a collimating action. The coupling lens may be a non-spherical lens, and wave-front aberration can be satisfactorily corrected by itself.

A polygon mirror may be used for the optical deflector. The polygon mirror may have 5 deflecting reflective surfaces and an inscribed circle diameter of 18 mm. The angle formed by an incident light flux onto a deflecting reflective surface of the polygon mirror from the light source and an optical axis of a scanning image forming lens system may be 60°.

The optical writing width may be ±161.5 mm, and the writing angle may be ±40.6°.

Data of the resin-made lenses 10 and 11 and the glass-made troidal lens 12 constituting a line image forming optical system is given below based on the above-noted examples of parameters. The lens surface distances d1–d6 are as illustrated in FIG. 1B in the examples as:

d1=3 mm, d2=9.2 mm, d3=3 mm, d4=8.15 mm, d5=6 mm, d6=114 mm;

radius of curvature of the lens surface 10a:
 −119.97 mm(spherical);

radius of curvature of the lens surface 10b:
 main scanning direction ∞;
 sub-scanning direction 16.4 mm;

radius of curvature of the lens surface 11a:
 main scanning direction ∞;
 sub-scanning direction −16 mm;

radius of curvature of the lens surface 11b;
 main scanning direction 1.0E+E;
 sub-scanning direction 18.03 mm;

radius of curvature of the lens surface 12a:
 main scanning direction ∞;
 sub-scanning direction 13.54 mm;

radius of curvature of the lens surface 12b:
 −186 mm (spherical).

The shape of the lens surface 11b, i.e., the lens surface on the incident side of the resin-made lens 11, is a sub-scanning non-arc surface. In the above description, 1.0E+8 means $1.0 \times 10^8$.

The shape of the lens surface 11b is as follows:
Rm=1.00E+08, Rs=18.03,
$A_4$=1.287048E−07, $A_6$=1.615827E−09,
$C_0$=3.681387E+01, $C_2$=1.88228E−01, $C_4$=1.542188E−02,
$C_6$=−4.0966661E−04, $C_8$=5.584789E−06,
$d_{4,0}$=3.496085E−04, $d_{4,2}$=−2.319818E−06, $d_{4,4}$=−7.859564E−08,
$d_{4,6}$=7.462640E−10, $d_{4,8}$=−2.952126E−11, $d_{6,0}$=6.055635E−06,
$d_{6,2}$=−1.070845E−06, $d_{6,4}$=−1.078958E−07, $d_{6,6}$=2.023609E−09,
$d_{6,8}$=−2.307748E−11.

Refractive index of the resin-made lenses 11 and 12: 1.523978 (λ=780 nm at 25° C.).

Refractive index of the glass-made troidal lens 12: 1.733278 (λ=780 nm at 25° C.).

Data of the resin-made lenses 61 and 62 constituting a scanning image forming optical system is given below. The surface distances d7–d11 are as illustrated in FIG. 1B in the examples as:

d7=71.6 mm, d8=30 mm, d9=66.3 mm, d10=8.5 mm, d11=159.3 mm, d12 (shifting quantity of the lens 61 in the main scanning direction)=0.2 mm, d13 (shifting quantity of the lens 62 in the main scanning direction)=0.2 mm.

The shifting quantity is positive in the upward direction in FIG. 1A.

Refractive index of the resin-made lenses 61 and 62: 1.523978 (λ=780 nm at 25° C.).

The shape of the lens surface 61(a) is as follows:
Rm=−1030.233346, Rs(0)=−89.518927,
K=−4.041619E+02,
$A_4$=6.005017E−08, $A_6$=−7.538155E−13, $A_8$=−4.036824E−16,
$A_{10}$=4.592164E−20, $A_{12}$=−2.396524E−24,
$B_1$=−9.317851E−06, $B_2$=3.269905E−06, $B_3$=4.132497E−09,
$B_4$=−4.207716E−10, $B_5$=−1.170114E−12, $B_6$=−4.370640E−14,
$B_7$=2.347965E−16, $B_8$=−6.212795E−18, $B_9$=−3.967994E−20,
$B_{10}$=−3.873869E−21, $B_{11}$=3.816823E−24, $B_{12}$=4.53584E−25.

The shape of the lens surface 61b is as follows:
Rm=−109.082474, Rs(0)=−110.881332,
K=−5.427642E−01,
$A_4$=9.539024E−08, $A_6$=4.882194E−13, $A_8$=−1.198993E−16,
$A_{10}$=5.029989E−20, $A_{12}$=−5.654269E−24,
$B_2$=−3.652575E−07, $B_4$=2.336762E−11, $B_6$=8.426224E−14,
$B_8$=−1.026127E−17, $B_{10}$=−2.202344E−21, $B_{12}$=1.224555E−26.

The shape of the lens surface 62a is as follows:
Rm=1493.654587, Rs(0)=−70.072432,
K=5.479389E+01,
$A_4$=−7.606757E−09, $A_6$=−6.311203E−13, $A_8$=6.133813E−17,
$A_{10}$=−1.482144E−21, $A_{12}$=2.429275E−26, $A_{14}$=−1.688771E−30,
$B_2$=−8.701573E−08, $B_4$=2.829315E−11, $B_6$=−1.930080E−15,
$B_8$=2.766862E−20, $B_{10}$=2.176995E−24, $B_{12}$=−6.107799E−29.

The shape of the lens surface 62b (sub-scanning non-arc surface) is as follows:
Rm=1748.583900, Rs(0)=−28.034612,
K=−5.488740E+02,
$A_4$=−4.978348E−08, $A_6$=2.325104E−12, $A_8$=−7.619465E−17,
$A_{10}$=3.322730E−21, $A_{12}$=−3.571328E−26, $A_{14}$=−2.198782E−30,
$B_1$=−1.440188E−06, $B_2$=4.696142E−07, $B_3$=1.853999E−11,
$B_4$=−4.153092E−11, $B_5$=−8.494278E−16, $B_6$=2.193172E−15,
$B_7$=9.003631E−19, $B_8$=−9.271637E−21, $B_9$=−1.328111E−22,
$B_{10}$=−1.409647E−24, $B_{11}$=5.520183E−27, $B_{12}$=4.513104E−30,
$C_0$=−9.999999E−01,
$d_{4,0}$=−1.320849E−07, $d_{4,2}$=−1.087674E−11, $d_{4,4}$=−9.022577E−16,
$d_{4,6}$=−7.344134E−20, $d_{6,0}$=9.396622E−09, $d_{6,2}$=1.148840E−12,
$d_{6,4}$=8.063518E−17, $d_{6,6}$=−1.473844E−20.

Figure 3A:
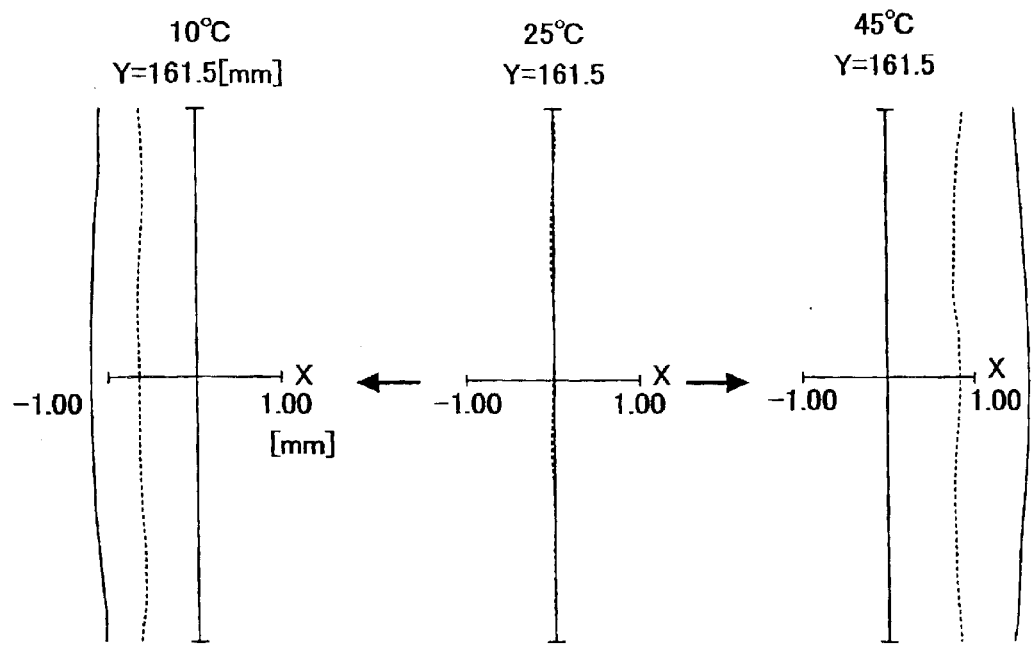
FIG. 3A and FIG. 3B are diagrams explaining curvature of field in a concrete example of the optical scanning device.

FIG. 3A is a diagram illustrating each curvature of field in the main and sub-scanning directions at 10° C., 25° C., and 45° C. when an equivalent glass-made cylindrical lens having a focal length of 45 mm is used in place of the above-described examples of a line image forming optical system. At 45° C., the image surface has shifted by about 1 mm in the main scanning direction and by about 1.5 mm in the sub-scanning direction relative to the design value at 25° C. Further, the shifting amounts in the main scanning and sub-scanning directions differ from each other.

Figure 3B:
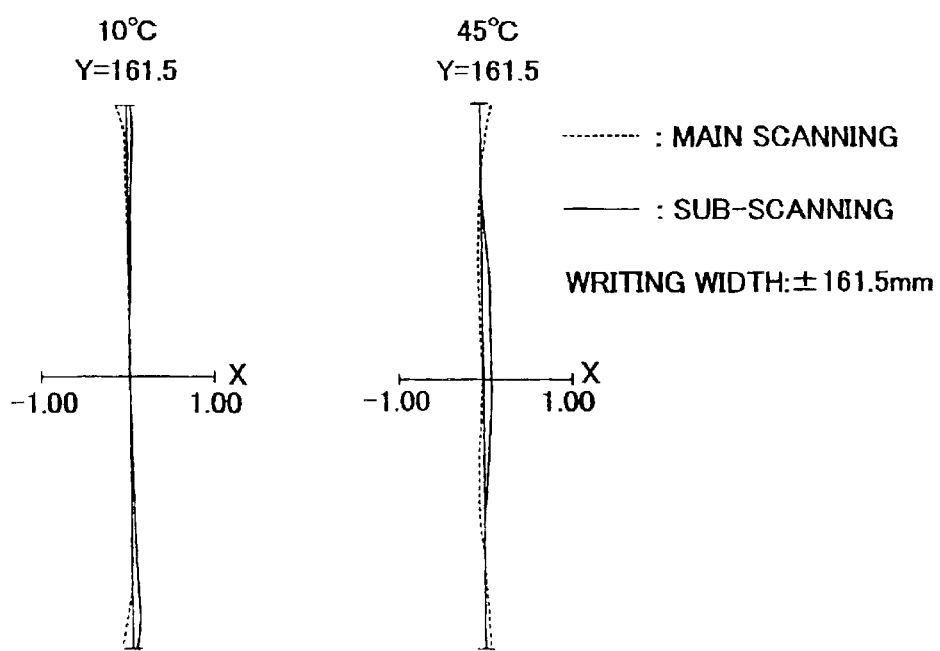

FIG. 3B is a diagram illustrating curvature of field when the above-described example of a line image forming optical system is used. The curvature of field at a set temperature is substantially identical to that in the center part of FIG. 3A. The shifting amount of the image surface has decreased to about 0.1 mm in the main and sub-scanning directions at 10° C. and 45° C. This decrease is realized by including the resin-made lenses 10 and 11 in the line image forming optical system and by including surfaces having powers in the main and sub-scanning directions in these lenses 10, 11 so that changes in the powers of the lenses 61 and 62 due to temperature changes are corrected.

Embodiment 1

In this embodiment, a feature of the present invention is applied to the lens surface 62b (sub-scanning non-arc surface) at the emerging side of the resin-made lens 62 constituting a scanning image forming optical system in the above-described concrete example.

Figure 4:
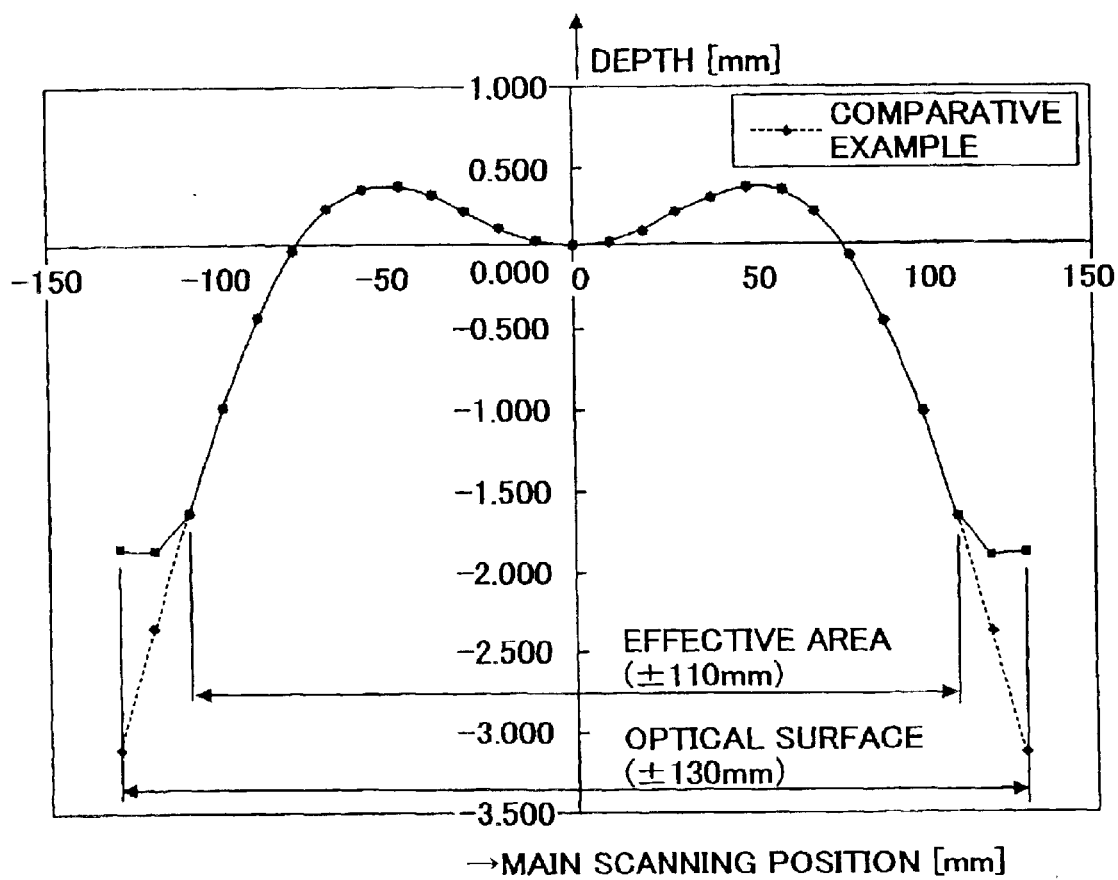
FIG. 4 is a diagram illustrating a shape of a lens surface of a lens in the main scanning cross-section, according to an embodiment of the present invention.

FIG. 4 is a diagram illustrating a shape of the lens surface 62b in the main scanning cross-section. As illustrated in FIG. 4, the effective area in the main scanning direction of the lens surface 62b is ±110 mm, and the optical surface width in the main scanning direction is ±130 mm. Accordingly, on both sides of the effective area, an area outside of the effective area, having a width of 20 mm, is provided. The effective area in the sub-scanning direction is ±4.0 mm and the optical surface width in the sub-scanning direction is ±5.4 mm.

A comparative example in which the area outside of the effective area is made to the above-described Xout(Y,Z) is illustrated by dotted lines in FIG. 4. The actual shape in the area outside of the effective area is illustrated by the solid line. This shape is obtained when $H_0=\pm110$ mm and Damp= $2.00\times10^{-12}$ in the above-described damping function $\{1+(H-H_0)\times Damp\}$.

In the comparative example illustrated by the dotted lines, the shape sharply changes in the area outside of the effective area of ±110 mm, whereas in the embodiment of the present invention, the shape smoothly and moderately changes in the area outside of the effective area of ±110 mm, so that a metal mold can be easily made. Accordingly, a relatively large area can be obtained outside of an effective area, so that a surface sink mark and/or an interior distortion will not occur in the effective area.

Figure 5:
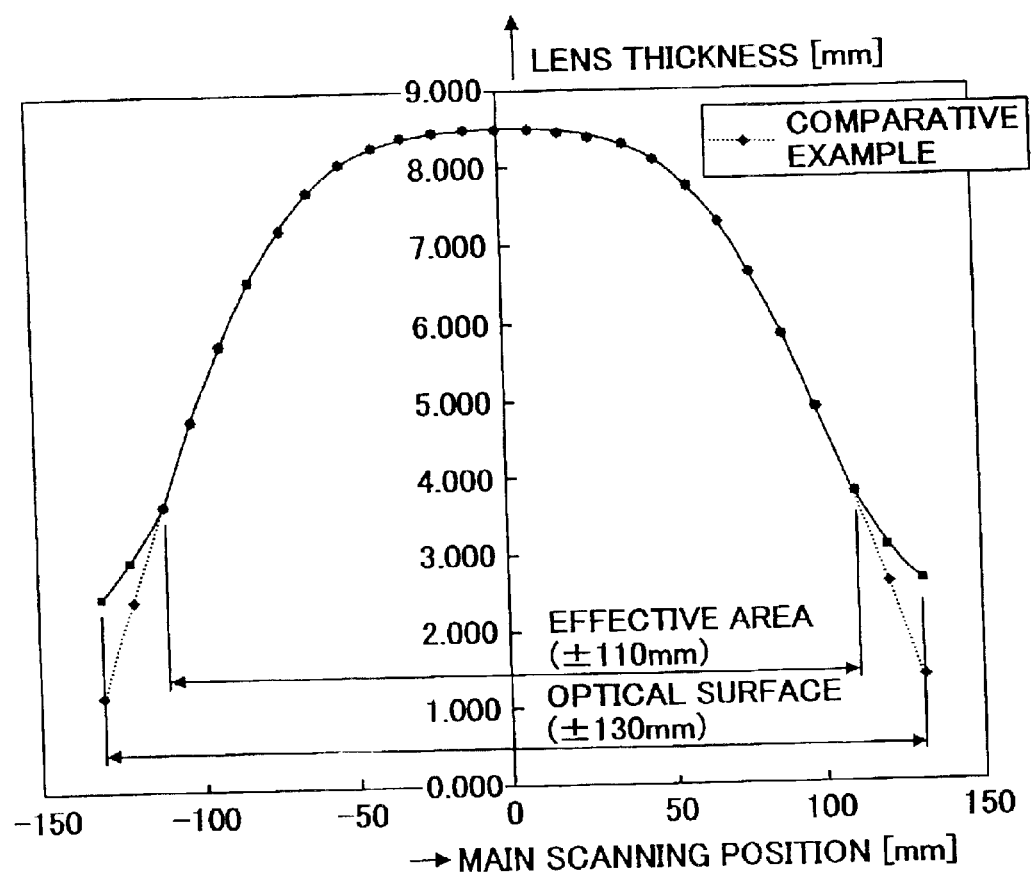
FIG. 5 is a diagram illustrating a thickness of the lens in the main scanning cross-section.

Further, as illustrated in FIG. 5, a difference in the thickness of the lens 62 of this embodiment (illustrated by the solid line) between the center part and the periphery part thereof is reduced relative to the comparative example (illustrated by dotted lines), so that an occurrence of a surface sink mark and/or an internal distortion can be suppressed.

Embodiment 2

In this embodiment, a feature of the present invention is applied to the lens surface 11b (sub-scanning non-arc surface) at the emerging side of the resin-made lens 11 in a line image forming optical system of the above-described concrete example.

Figure 6:
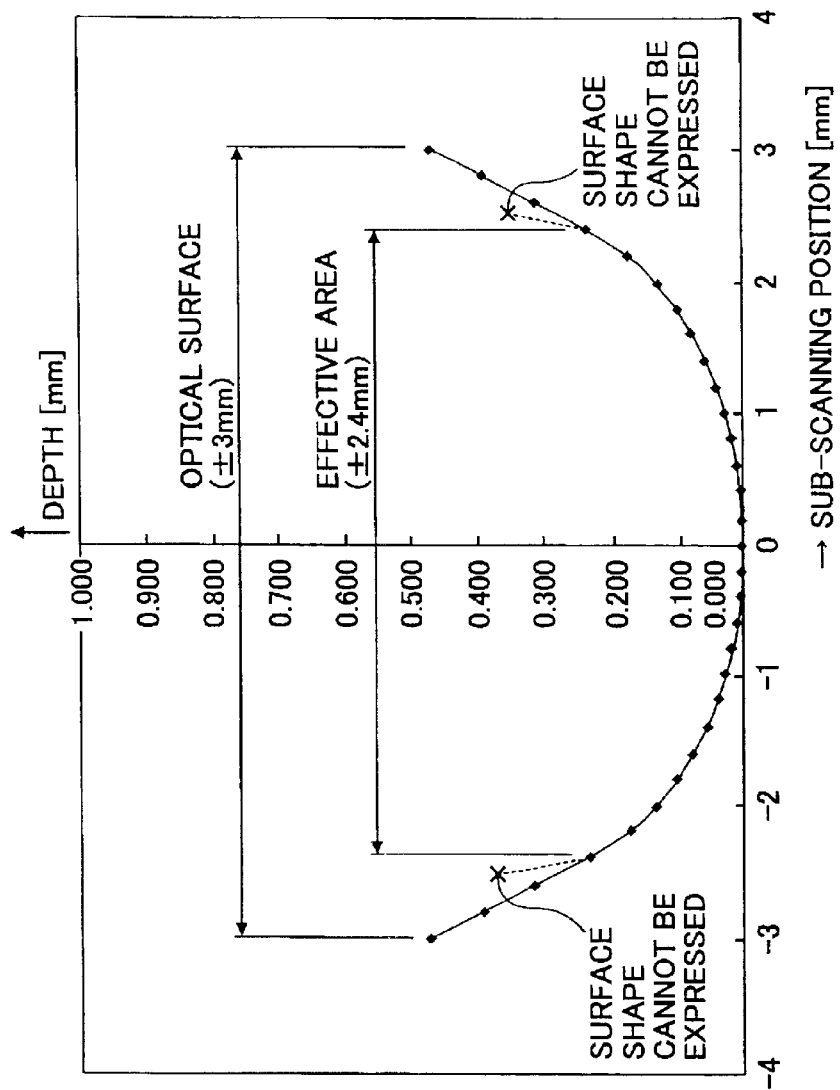
FIG. 6 is a diagram illustrating a shape of a lens surface of a lens according to another embodiment of the present invention.

FIG. 6 is a diagram illustrating a shape of the lens surface 11b in the sub-scanning cross-section. As illustrated in FIG. 6, the effective area in the sub-scanning direction of the lens surface 62b is ±2.4 mm, and the optical surface width in the sub-scanning direction is ±3 mm. Accordingly, on both sides of the effective area, an area outside of the effective area having a width of 0.6 mm is provided. The effective area in the main scanning direction is ±4.5 mm, and the optical surface width in the main scanning direction is ±5.5 mm.

In a comparative example illustrated by dotted lines in FIG. 6, in the area outside of the effective area of ±2.4 mm in the sub-scanning direction, because $\{1-(1+K)(Y/Rm)^2\}$ is negative, the shape cannot be expressed by a non-arc shape defining a shape in the effective area. However, by using an inclination (1st derivative) at the coordinate H0 of the outermost side of the effective area, an appropriate shape can be expressed in the area outside of the effective area.

That is, the shape of the area outside of the effective area in FIG. 6 is the one expressed by the above-described formula:

$$X\text{out}(Y,Z)=[X\text{in}(Y,H_c)]+\{\partial[X\text{in}(Y,H_c)]/\partial Z\}\times(H-H_c).$$

Thus, a relatively large area outside of an effective area can be assured, and at the same time an optical surface smoothly and seamlessly continuing between the effective area and the area outside of the effective area can be expressed. Accordingly, a metal mold can be easily made, and at the same time, in plastic molding occurrence of a surface sink mark and/or an internal distortion can be suppressed, so that a surface sink mark and/or an internal distortion will not occur in the effective area.

The lenses 62 and 11 in the above-described embodiments 1 and 2 are resin-made optical elements, which are made by plastic molding and which have at least one optical surface (on the emerging side in both of the embodiments) formed in a non-spherical shape. The optical surface having the non-spherical shape is constituted of an effective area and an area outside of the effective area. The shape of the optical surface in the area outside of the effective area smoothly continues to that in the effective area, and is made different from the non-spherical surface in the effective area.

The lens 62 of Embodiment 1 is a resin-made non-spherical optical element, in which the shape of an optical surface having a non-spherical shape in an area outside of an effective area is made to a shape obtained by multiplying a shape Xout(Y,Z) of the optical surface in the area outside of the effective area, that is extended from the non-spherical shape X(Y,Z) in the effective area, by a damping function $\{1+(H-H_0)\times Damp\}$ so that a change in an axial direction in the shape of the optical surface in the area outside of the effective area is moderated.

The optical surface having the non-spherical shape of the lens 62 has shapes different from each other in two directions orthogonal to an optical axis and to each other, and the optical surface in at least one of the two directions is an anamorphic optical surface having a non-arc shape. Further, the optical surface includes the effective area and the area outside of the effective area in the direction in which the optical surface has the non-arc shape. The lens 62 is a lens for use in an optical scanning device in which the two directions orthogonal to each other correspond to a main scanning direction and a sub-scanning direction, and is used in a scanning image forming optical system of the optical scanning device, which condenses a light flux deflected by a deflector toward a scanned surface to be formed into an optical spot on the scanned surface.

The lens 11 is a resin-made non-spherical optical element in which the shape Xout(Y,Z) in the area outside of the effective area of the optical surface having the non-spherical shape X(Y,Z) is made to a shape $[X\text{in}(Y,H_0)]+\{\partial[X\text{in}(Y,H_c)]/\partial Z\}\times(H-H_c)$ having a slope expressed by a 1st derivative at an outermost periphery $H_0$ of the effective area in the non-spherical shape. The optical surface having the non-spherical shape of the lens 11 has shapes different from each other in two directions orthogonal to an optical axis and to each other, and the optical surface in at least one of the two directions is an anamorphic optical surface having a non-arc shape. Further, the optical surface of the lens 11 includes the effective area and the area outside of the effective area in the direction in which the optical surface has the non-arc shape.

The lens 11 is a lens for use in an optical scanning device in which the two directions orthogonal to each other correspond to a main scanning direction and a sub-scanning direction, and is used in a line image forming optical system of the optical scanning device, which forms a light flux coupled from a light source side into a line image extending in the main scanning direction in a vicinity of a deflecting reflective surface of a deflector.

In the above-described Embodiments 1 and 2, when a width of the optical surface is Wo and a width of the effective area is We, in Embodiment 1 the value of We/Wo is 0.86 in the main scanning direction and is 0.73 in the sub-scanning direction, and in Embodiment 2 the value of We/Wo is 0.82 in the main scanning direction and is 0.8 in the sub-scanning direction, thus satisfying the condition We/Wo<0.9 (2).

Accordingly, an optical scanning device having an optical arrangement described in FIGS. 1A and 1B and using the resin-made lens 62 of Embodiment 1 and the resin-made lens 11 of Embodiment 2 is an optical scanning device in which a light flux from the light source 1 is coupled by the coupling lens 2, the coupled light flux is deflected by the optical deflector 5, the deflected light flux is condensed toward the scanned surface 7 by a scanning image forming optical system, thereby forming an optical spot on the scanned surface 7 and optically scanning the scanned surface 7, and in which a resin-made non-spherical optical element of the present invention is arranged on an optical path from the light source 1 to the scanned surface 7. The optical scanning device includes a line image forming optical system that forms the coupled light flux into a line image extending in the main scanning direction in the vicinity of a deflecting reflective surface of the optical deflector 5, and the lens 11 of Embodiment 2 is used in the line image forming optical system and the lens 62 of Embodiment 1 is used in the scanning image forming optical system of the optical scanning device.

Figure 7:
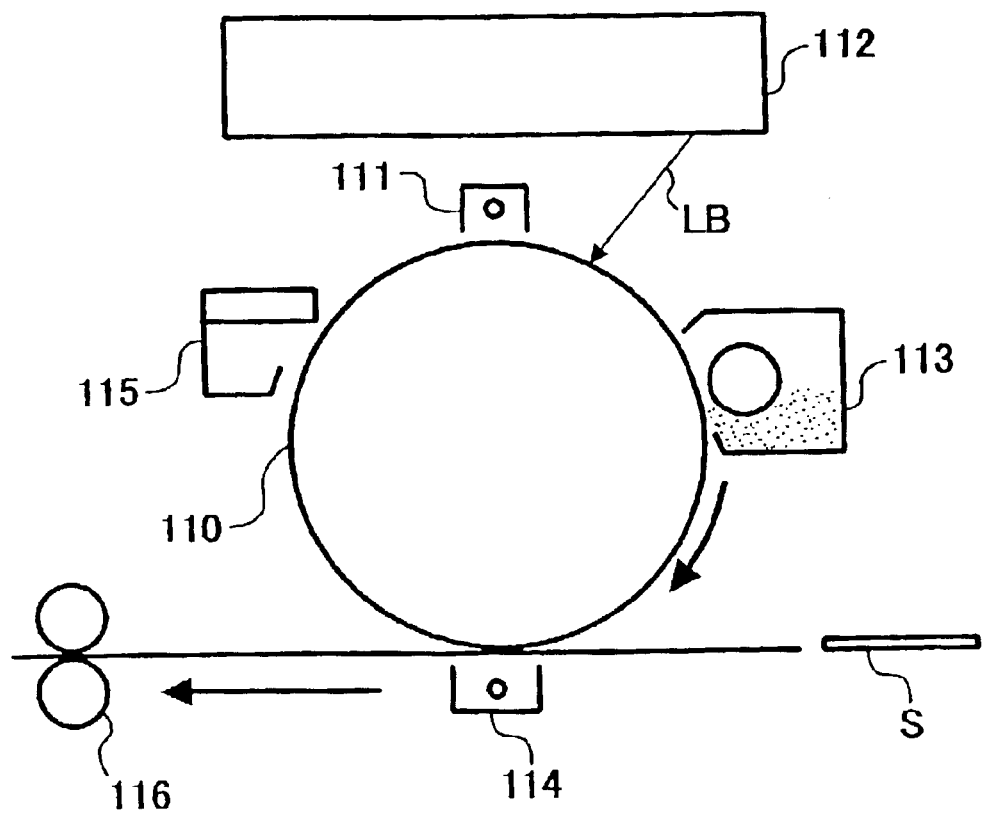
FIG. 7 is a diagram illustrating an image forming apparatus according to an embodiment of the present invention.

FIG. 7 is a diagram illustrating an image forming apparatus according to an embodiment of the present invention. The image forming apparatus is a laser printer.

The laser printer includes a cylindrically-formed photoconductor as a photosensitive medium 110. A charging device 111, a developing device 113, a transfer device 114, and a cleaning device 115 are arranged around the photosensitive medium 110. Although a corona charger is illustrated in FIG. 7, a contact-type charging roller can also be used. Further, although a corona-discharging type transfer device is illustrated in FIG. 7, a contact-type roller can be also used.

An optical scanning device 112 using a laser beam LB is provided so that an exposure by optical writing is performed between the charging device 111 and the developing device 113. In FIG. 7, reference numeral 116 denotes a fixing device and reference symbol S denotes a transfer sheet as a sheet-like-shaped recording medium.

When forming an image, the photosensitive medium 110 is rotated in the clockwise direction at a constant velocity, and the surface of the photosensitive medium 110 is uniformly charged by the charging device 111, and is then exposed by optical writing with the laser beam LB of the optical scanning device 112, so that an electrostatic latent image is formed on the photosensitive medium 110. An image portion is exposed, so that the formed electrostatic latent image is a negative latent image.

The latent image is developed in reverse by the developing device 113, so that a toner image is formed on the photosensitive medium 110. A transfer sheet S is conveyed into a transfer part at a timing with the toner image on the photosensitive medium 110 moving to the transfer part. At the transfer part, the transfer sheet S is superposed with the toner image, and the toner image is electrostatically transferred onto the transfer sheet S by the action of the transfer device 114. The transfer sheet S on which the toner image has been transferred is conveyed to the fixing device 116, where the toner image is fixed to the transfer sheet S. The transfer sheet S is then discharged. The surface of the photosensitive medium 110 after the toner image has been transferred onto the transfer sheet S is cleaned with the cleaning device 115, so that residual toner and paper dust are removed from the surface of the photosensitive medium 110. An OHP (overhead projector) sheet can be used in place of the transfer sheet S. Further, transfer of a toner image can be made by an intermediate medium such as an intermediate transfer belt.

For the optical scanning device 112, the lenses of the above-described Embodiments 1 and 2 are used. Satisfactory image formation can be performed by using the optical scanning device of FIGS. 1A and 1B.

The image forming apparatus of FIG. 7 is an apparatus that forms an image by optically scanning the photosensitive medium 110, and the above-described optical scanning device of the present invention is used for optically scanning the photosensitive medium 110. A latent image is formed on the photosensitive medium 110 by optically scanning the photosensitive medium 110, and the latent image is made visible. The photosensitive medium 110 is a photoconductor, and the latent image is formed as an electrostatic latent image, which is then made visible as a toner image, and the toner image is finally formed on the sheet-like-shaped recording medium S.

Numerous additional modifications and variations of the present invention are possible in light of the above teachings. It is therefore to be understood that within the scope of the appended claims, the present invention may be practiced otherwise than as specifically described herein.

The present document claims priority and contains subject matter related to Japanese Patent Application No. 2001-169360 filed in the Japanese Patent Office on Jun. 5, 2001, and the entire contents of which are hereby incorporated herein by reference.

What is claimed is:

1. A resin-made non-spherical optical element made by plastic molding and having at least one optical surface formed in a non-spherical shape, wherein the at least one optical surface having the non-spherical shape includes an effective area and an area outside of the effective area located outside of the effective area, and wherein a shape of the optical surface in the area outside of the effective area smoothly continues to a shape in the effective area and is different from the non-spherical shape in the effective area.

2. The resin-made non-spherical optical element according to claim 1, wherein the shape of the optical surface having the non-spherical shape in the area outside of the effective area is a shape obtained by multiplying a shape of the optical surface in the area outside of the effective area, that is extended from the non-spherical shape in the effective area, by a damping function to damp a change in an optical axis direction in the shape of the optical surface in the area outside of the effective area.

3. The resin-made non-spherical optical element according to claim 2, wherein the optical surface having the non-spherical shape has different shapes in two directions orthogonal to an optical axis and to each other, wherein the optical surface in at least one of the two directions is an anamorphic optical surface having a non-arc shape, and wherein the optical surface includes the effective area and the area outside of the effective area in the direction in which the optical surface has the non-arc shape.

4. The resin-made non-spherical optical element according to claim 3, wherein the optical element is a lens for an optical scanning device in which the two directions orthogonal to each other correspond to a main scanning direction and a sub-scanning direction.

5. The resin-made non-spherical optical element according to claim 4, wherein the optical element is used in a scanning image forming optical system of the optical scanning device, which condenses a light flux deflected by a deflector toward a scanned surface and forms the light flux into an optical spot on the scanned surface.

6. The resin-made non-spherical optical element according to claim 1, wherein the shape of the optical surface having the non-spherical shape in the area outside of the effective area has a slope expressed by a 1st derivative at an outermost periphery of the effective area in the non-spherical shape.

7. The resin-made non-spherical optical element according to claim 6, wherein the optical surface having the non-spherical shape has different shapes in two directions orthogonal to an optical axis and to each other, wherein the optical surface in at least one of the two directions is an anamorphic optical surface having a non-arc shape, and wherein the optical surface includes the effective area and the area outside of the effective area in the direction in which the optical surface has the non-arc shape.

8. The resin-made non-spherical optical element according to claim 7, wherein the optical element is a lens for an optical scanning device in which the two directions orthogonal to each other correspond to a main scanning direction and a sub-scanning direction.

9. The resin-made non-spherical optical element according to claim 8, wherein the optical element is used in a line image forming optical system of the optical scanning device, which forms a light flux coupled from a light source side into a line image extending in the main scanning direction in a vicinity of a deflecting reflective surface of a deflector.

10. The resin-made non-spherical optical element according to claim 1, wherein a condition We/Wo<0.9 is satisfied, in which Wo is a width of the optical surface and We is a width of the effective area.

11. An optical scanning device for optically scanning a scanned surface, comprising:

a light source;

a coupling lens configured to couple a light flux from the light source to a subsequent optical system;

a deflector configured to deflect the coupled light flux;

a scanning image forming optical system configured to condense the deflected light flux toward the scanned surface to be formed into an optical spot on the scanned surface so that the scanned surface is scanned by the optical spot; and a resin-made non-spherical optical element arranged on an optical path from the light source to the scanned surface, wherein the resin-made non-spherical optical element is made by plastic molding and has at least one optical surface formed in a non-spherical shape, wherein the at least one optical surface having the non-spherical shape includes an effective area and an area outside of the effective area located outside of the effective area, and wherein a shape of the optical surface in the area outside of the effective area smoothly continues to a shape in the effective area and is different from the non-spherical shape in the effective area.

12. The optical scanning device according to claim 11, further comprising:

a line image forming optical system configured to form a light flux coupled from a light source side into a line image extending in the main scanning direction in a vicinity of a deflecting reflective surface of the deflector.

13. The optical scanning device according to claim 12, wherein the resin-made non-spherical optical element is used in the line image forming optical system.

14. The optical scanning device according to claim 12, wherein the resin-made non-spherical optical element is used in the scanning image forming optical system.

15. An image forming apparatus, comprising:

a photosensitive medium configured to form an image thereupon; and an optical scanning device configured to scan a scanned surface of the photosensitive medium to form the image thereupon, the optical scanning device including a resin-made non-spherical optical element, wherein the resin-made non-spherical optical element is made by plastic molding and has at least one optical surface formed in a non-spherical shape, wherein the at least one optical surface having the non-spherical shape includes an effective area and an area outside of the effective area located outside of the effective area, and wherein a shape of the optical surface in the area outside of the effective area smoothly continues to a shape in the effective area and is different from the non-spherical shape in the effective area.

16. The image forming apparatus according to claim 15, wherein a latent image is formed on the photosensitive medium by optical scanning the photosensitive medium with the optical scanning device, and wherein the latent image is made visible.

17. The image forming apparatus according to claim 16, wherein the photosensitive medium is a photoconductor and the latent image is formed as an electrostatic latent image, wherein the latent image is made visible as a toner image, and wherein the toner image is configured to be transferred onto a sheet-like-shaped recording medium.

18. An optical scanning device for optically scanning a scanned surface, comprising:

light source means for generating a light flux;

coupling means for coupling a light flux from the light source means to a subsequent optical system;

deflecting means for deflecting the coupled light flux; and scanning and image forming means for condensing the deflected light flux toward the scanned surface into an optical spot on the scanned surface and for scanning the scanned surface by the optical spot, wherein a resin-made non-spherical optical element is arranged on an optical path from the light source to the scanned surface, wherein the resin-made non-spherical optical element is made by plastic molding and has at least one optical surface formed in a non-spherical shape, wherein the at least one optical surface having the non-spherical shape includes an effective area and an area outside of the effective area located outside of the effective area, and wherein a shape of the optical surface in the area outside of the effective area smoothly continues to a shape in the effective area and is different from the non-spherical shape in the effective area.

19. The optical scanning device according to claim 16, further comprising:

line image forming means for forming a light flux coupled from a light source side into a line image extending in a main scanning direction in a vicinity of a deflecting reflective surface of the deflecting means.

20. The optical scanning device according to claim 19, wherein the resin-made non-spherical optical element is used in the line image forming optical system.

21. The optical scanning device according to claim 19, wherein the resin-made non-spherical optical element is used in the scanning image forming optical system.

* * * * *